July 6, 1937.    F. H. ENSIGN    2,085,902
EGG COOKER
Filed Dec. 10, 1936
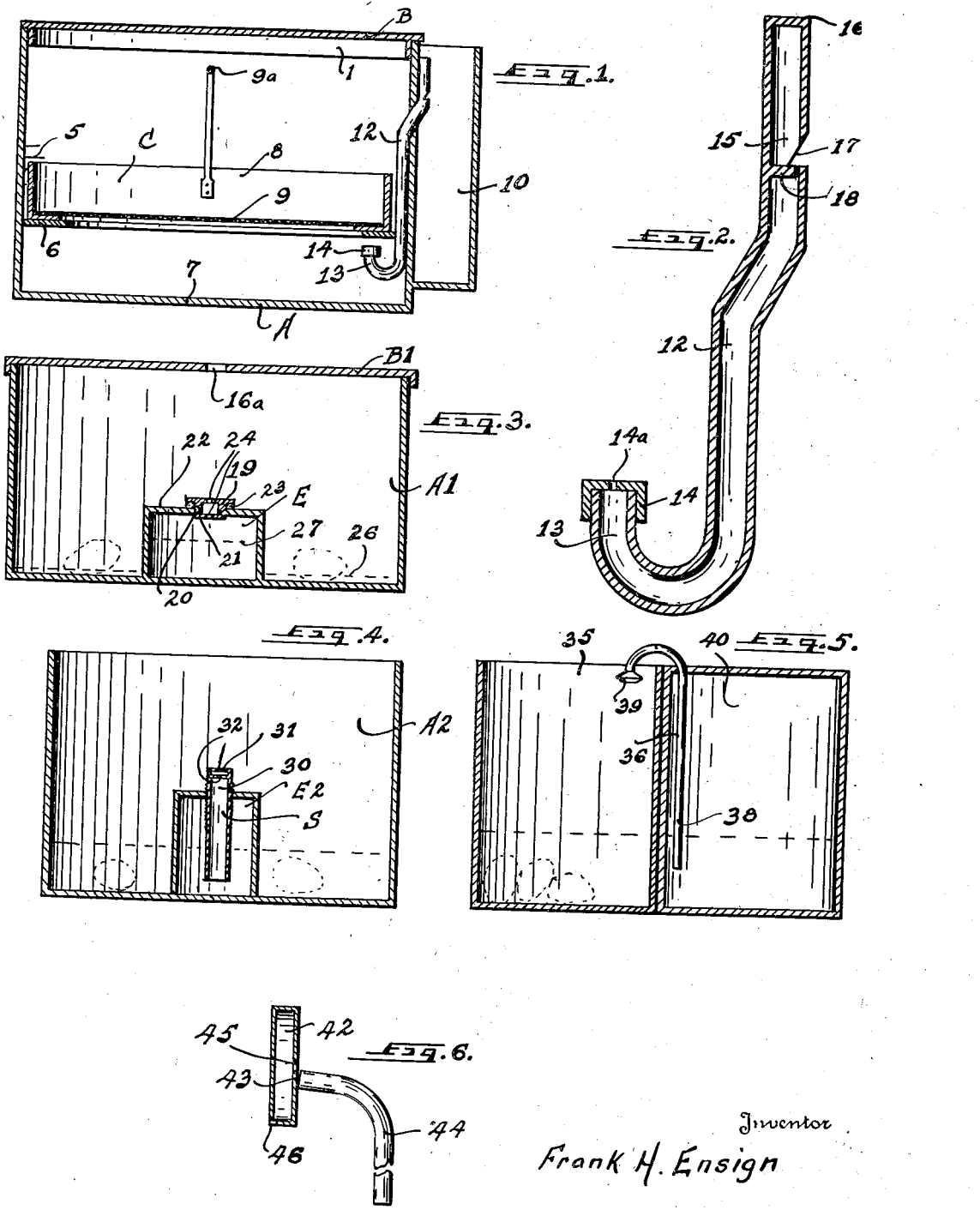
Inventor
Frank H. Ensign
By R. M. Thomas
Attorney Patented July 6, 1937

2,085,902

UNITED STATES PATENT OFFICE 2,085,902

EGG COOKER

Frank H. Ensign, Salt Lake City, Utah

Application December 10, 1936, Serial No. 115,234

8 Claims. (Cl. 53—1)

This application is a continuation in part of my former patent application for Egg cooking device filed Feb. 13, 1934, Serial No. 710,989 and allowed Dec. 11, 1935, with certain improvements incorporated therein.

My invention relates to the cooking of eggs and has for its object to provide a new and efficient egg cooker which will cook the eggs the period of time desired and which will sound an alarm when the eggs have been so cooked.

A further object is to provide a new and efficient egg cooking vessel in which a predetermined amount of water is placed and in which the eggs are placed for cooking and when the eggs are done some of the water will be displaced into another vessel and an alarm signal or whistle will be sounded.

A still further object is to provide a single vessel having a smaller concentric vessel sealed therein each of which carries a predetermined amount of water depending upon the time desired to cook the eggs in the larger and which water will be displaced from the inner vessel into the larger vessel and will then cause a whistle to sound by the escaping steam pressure informing the person cooking eggs that they are done.

A still further object is to provide an adjustable egg cooking vessel which has the level of the alarm signal changed for any predetermined period of time required or desired for cooking an egg or eggs.

A still further object is to provide an egg cooking vessel in which the time required to bring a larger amount of water to steam generating point to sound a signal and a smaller amount of water to cook the eggs is employed which larger amount of water may be varied depending upon the length of time desired to cook the eggs.

These objects I accomplish with the device illustrated in the accompanying drawing in which similar numerals and letters of reference indicate like parts throughout the several views and as described in the specification forming a part of this application and pointed out in the appended claims.

In the drawing:

Figure 1 is a diametrical section of a cooking vessel employing the displacement of water principle.

Figure 2 is an enlarged section of the warning whistle shown in Figure 1.

Figure 3 is a diametrical section of a cooking vessel in which heating and generating of steam is the principle employed to cook the eggs and sound the signal.

Figure 4 is a diametrical section of a like vessel changed to employ the water displacement principle.

Figure 5 is a diametrical section of the same principle using two vessels to sound the signal and cook the eggs.

Figure 6 is an enlarged section of a modified low pressure whistle for use in the device.

In the drawing I have shown the vessel or container as A, and the cover therefor as B. The cover B is made heavy and with a flange 1 thereon depending down into the vessel A sufficient distance to seal the vessel and with sufficient weight to hold the vessel fairly tightly sealed in order to create a steam pressure therewithin.

In the vessel A, I then provide a water level indicating line 5 and a shelf 6 is secured in the vessel a small distance above the bottom 7. Onto this shelf I then provide an egg cooking tray C which consists of a side wall 8 with a screen bottom 9 or a perforated bottom may be used in the tray C. A handle 9a is provided to lift the tray. Onto one side of the vessel A, I provide a semi-circular water chamber 10 with the top open and the bottom and sides secured to the outer wall of the vessel A.

In the vessel A, I then provide the signal which consists of a tube 12 having one end turned up at 13 with a jet 14 carried thereon. The jet 14 consists of a cap to fit over the end of the tube 12 with a port 14a therethrough to allow water to be forced into the tube 12. The top end of the tube 12 is passed out through a hole in the side of the vessel into the chamber 10 and the top end of the tube is made in the form of a whistle 15. Any whistle suitable may be used, that shown being made by closing the end 16 of the tube, cutting a V-shaped notch 17 in the tube and providing a partial closure plug 18 in the tube adjacent the straight side of the V-notch.

An escape valve may be provided to prevent breaking the vessel or accident therefrom, if desired.

In Figure 3 of the drawing I have shown another form of egg cooking vessel where the water signal and timing chamber is shown secured centrally onto the bottom of the cooking vessel which is shown as the vessel A1. This vessel is made like any other cooking vessel but in the center thereof I make a small water signal and timing chamber E which water chamber E is the means for timing the cooking of the eggs. A flanged lid B1 is provided as a cover for the vessel A1 said lid having an opening 16a therein to allow for passage of steam from the vessel and for permitting the sound of the whistle to pass therefrom. The chamber E is made as a cylindrical chamber having the top closed at 22 and carrying a removable whistle 19 therein. The hole in which the whistle is screwed is formed with depressed and raised lugs 20 thereon into which the threads 21 of the whistle 19 are screwed and a gasket 23 is carried above the whistle to provide a seal. The whistle consists of a hollow body having aligned ports 24 therethrough to cause the steam escaping from the chamber E to sound a warning. The dotted water line 26 shown in the vessel is the amount of water required to cook the eggs and keep them from burning and sufficient water to prevent the vessel from cooking dry. The water line 27 in the chamber E indicates the amount required to cook an egg four minutes. Other marks may be made for other time requirements.

In Figure 4, I have shown the same cooking vessel as A2, with the chamber for timing shown as E2 but, through the top of the chamber I have shown another type of whistle S, and in this type of device displacement of water takes place before the signal is sounded. The whistle body is shown as 30 screwed into a threaded hole in the top of the chamber E2 and a double walled hollow whistle 31 is formed in the top end of the body 30 with holes 32 to allow for passage of water from the chamber and for sounding of the alarm. In this type of device water to cover the eggs is placed in the outside vessel A2 and water to the amount of displacement is placed in the chamber E2. When the heat has generated sufficient steam to force water through the body 30 of the whistle until the bottom of the body is above the level of the water, the warning whistle will sound by the generated steam and the eggs will be done. The whistle may be adjusted up or down, the desired amount for two, three, or four minute eggs, as desired by the user.

In Figure 5, I have shown a device in which two vessels 35 and 40 are used placed side by side, with one closed and the other open. The vessel 35 is the cooking vessel, and is left open and the eggs placed therein. The whistle 36 is removed and the water placed in the vessel 40 through the hole in which the whistle is placed. The amount of water desired is placed in the vessel and the whistle inserted.

The whistle 36 is made of a tubular body 38 having the top end curved over the other vessel with the whistle 39 formed onto the end thereof.

A friction fit is made between the whistle and the cover of the vessel 40, and the vessel 40 is set over half of the burner and the cooking vessel 35 over the other half.

In Figure 6, I have shown a type of low pressure whistle 42 which may be used in my device to replace the other whistle if desired. This whistle 42 is set onto the end 43 of a curved conduit or tube 44 which is set in the vessel in any of the forms shown. The body of the whistle is made of a drum-shaped body having a hollow center and with a port 45 in front of and slightly above the slanting end 43 of the conduit 44. Through one bottom corner of the body I provide a drainage hole 46 to drain off collected water or steam. The force of the steam passing through the conduit 44 passes out of the slanting end 43 and across the port 45 making a high shrill sound.

Having thus described my invention, I desire to secure by Letters Patent and claim.

1. In an egg cooking vessel, the combination of a vessel; a water chamber secured thereonto; a signal tube secured in said vessel and discharging into said water chamber, said tube having a whistle formed in the end within the water chamber; and a lid for said vessel to provide a steam chamber therein with the pressure to force water from the vessel into the water chamber through the signal tube to sound the whistle when the water is below the level of the entrance to the tube.

2. In an egg cooker, the combination of a vessel; a lid for said vessel; a tray carried therein; a section in said tray in which eggs may be placed after removing them from the shell; a signal tube carried in said vessel, said tube having a whistle formed in the top outlet end thereof, with the entrance to the tube spaced from the bottom of the vessel, the whistle to be sounded when the steam pressure has forced sufficient water from the vessel through the tube to allow steam to pass through the tube and sound the whistle.

3. In a cooking vessel, the combination of a vessel; a water chamber; a signal tube leading from the vessel into the water chamber with the lower end of the tube in the vessel spaced above the bottom of the vessel; a whistle formed in said tube within the water chamber comprising a notch in one side of the tube spaced down from a closed top end and a plug inserted into the tube adjacent said notch.

4. In an egg cooking vessel, the combination of a cooking vessel, in which the water for cooking is placed to a predetermined level; a steam tight cover for said vessel; a small water chamber secured onto one side of said vessel sealed air tight therefrom; and a small diametered tube leading from the cooking vessel into the water chamber, with a whistle in the top end of the tube in the water chamber, said tube to carry water from the cooking vessel into the water chamber, the steam in the cooking vessel to sound the whistle in the tube when sufficient water has been displaced from the cooking vessel to a level below the open end of the tube.

5. In an egg cooking vessel of the class described, the combination of a cooking vessel; a steam tight cover for the vessel; an open water chamber mounted onto one side of the vessel; a removable tray to fit into said vessel; a signal tube leading from the water in the cooking vessel into the water chamber with a whistle in the end of the tube in the water chamber above the topmost level of the water in the cooking vessel, the tube to carry water from the cooking vessel into the water chamber when sufficient steam pressure has been created above the water level in the cooking vessel to force the water through the tube until the level of the water in the cooking vessel is below the end of the tube, the steam then passing through the tube to sound the whistle.

6. In an egg cooking device of the class described, the combination of a vessel; a smaller vessel mounted therein; a closure for the top of the smaller vessel having an opening therein; and a whistle secured in said opening to sound when water in the smaller has reached sufficient heat to cause steam to pass through said whistle.

7. In an egg cooking vessel of the class described, the combination of a cooking vessel; a smaller vessel mounted therein; means by generated steam to sound a warning whistle in the top of the smaller vessel when the eggs in the larger vessel have been cooked.

8. In an egg cooking vessel, the combination of a large cooking vessel in which a small amount of water is placed together with the eggs to be cooked; a lid therefor having an opening therein; a smaller vessel mounted concentric within said larger vessel with the bottom of the large vessel the bottom of the small vessel, with water to be placed in the smaller vessel of greater depth than in the larger vessel; means to close the top of the smaller vessel; a whistle in the top of the small vessel to sound when the eggs are done.

FRANK H. ENSIGN.